United States Patent [19]

Hiestand

[11] Patent Number: 4,725,065
[45] Date of Patent: Feb. 16, 1988

[54] DEVICE FOR THE COUPLING OF ATTACHMENT CHUCKING JAWS TO BASIC JAWS OF A CHUCK

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 870,158

[22] Filed: Jun. 2, 1986

[30] Foreign Application Priority Data

Jun. 3, 1985 [DE] Fed. Rep. of Germany ....... 3519785

[51] Int. Cl.⁴ .............................................. B23B 31/16
[52] U.S. Cl. .................................... 279/123; 279/1 SJ
[58] Field of Search .................... 29/568; 279/1 SJ, 4, 279/123

[56] References Cited

U.S. PATENT DOCUMENTS 3,744,125 7/1973 Schalles ................................ 29/568
4,587,708 5/1986 Miyachi ................................ 29/568

FOREIGN PATENT DOCUMENTS 47096 3/1982 European Pat. Off. ............ 279/123
2610587 9/1977 Fed. Rep. of Germany ........ 29/568

Primary Examiner—Z. R. Bilinsky
Attorney, Agent, or Firm—McGlew and Tuttle

[57] ABSTRACT

In a device for the coupling of attachment chucking jaws (31) to basic jaws (11) which are movably guided in a chuck body (2) of a chuck (1), the basic jaws each have an extension (21), projecting in an axial direction, with a collar (23) projecting inwardly and/or outwardly on each extension. A recess (32) is machined into the attachment chucking jaws (31) which recess is provided with an undercut (33) and with a countersurface interacting with a stop surface of the extension (21). A locking member (41) is inserted into each basic jaw for arresting the attachment chucking jaws (31), which locking member is movable axially and introducible into the attachment chucking jaws. The actuation of the locking members is provided by an axially movable control element (42) which is automatically connected mechanically to the locking members (41) via an intermediate member (43) and/or via a deflection member (44). Due to this design the locking action is readily accomplished and monitored.

15 Claims, 10 Drawing Figures

4,725,065

DEVICE FOR THE COUPLING OF ATTACHMENT CHUCKING JAWS TO BASIC JAWS OF A CHUCK

FIELD AND BACKGROUND OF THE INVENTION

The invention relates to a device for coupling attachment chucking jaws to basic jaws which are adjustably guided in the chuck body of a chuck and which are connectable in form-closing manner by a radial motion to the attachment chucking jaws. Each basic jaw has an extension which projects in the axial direction of the chuck body and on which is disposed a stop surface as well as a projection in the form of a locking nose projecting inwardly and/or outwardly perpendicular to the axis. A recess of the extension is machined into each attachment chucking jaw. Each attachment jaw is in the chuck body and secured against rotation. Each recess is provided with a countersurface interacting with the stop surface of the extension and there is inserted in each basic jaw for the arresting of the attachment chucking jaws, an axially movable locking member which can be locked in a recess machined in the attachment jaws.

An attachment chucking jaw change system of this kind is known from German OS No. 33 37 047 (U.S. patent application No. 657,339 now U.S. Pat. No. 4,634,207, and has also proven successful in practical application. The locking members provided therein for the arresting of the attachment chucking jaws in their decoupled position are designed as detent bolts which are movably inserted against the force of a spring in the extension of a basic jaw and engage associated recesses in the attachment chucking jaws. By means of tools which can be applied through these recesses and are held in a pallet, the detent bolts an be pushed back for a change of attachment chucking jaws, thus releasing the lock in short order. It has, however, proven to be a disadvantage that the attachment chucking jaws must have a hole which cannot be closed and can be contaminated by dirt. This can lead to operating breakdowns because the contact between attachment chucking jaws and basic jaws can be impaired and the detent bolts sometimes get caught on acount of chips or other dirt particles. Monitoring the respective operating status, therefore, is associated with considerable expense in this device.

In addition, axial forces to push back the springs acting upon the detent bolts must be transmitted through the pallet or a handling device for carrying the attachment chucking jaws, a requirement which often ircreases the structural costs. Moreover, the springs assigned to the basic jaws or to the attachment chucking jaws can break, in which case an automatic, reliable detention and, hence, locking of the attachment chucking jaws is no longer assured so that there is no guarantee in this case that a workpiece is reliably chucked.

SUMMARY OF THE INVENTION

It is therefore, an object of the invention to improve the device of the above described kind so that the attachment chucking jaws are always retained by the basic jaws with functional reliability and that the interlock between them is easy to establish and can be monitored readily. In particular, it should be possible to design the attachment chucking jaws so as to be closed so that no dirt can get between them and the basic jaws and that the locking system be form-closing without the aid of spring forces. Furthermore, it should not be necessary to apply axially oriented forces through the through the pallet or a handling device for carrying feeding in the attachment chucking jaws.

According to the invention, these ends are accomplished in that the actuation of the locking members is achieved by axially movable or rotatable control element automatically connected mechanically to the locking members via an intermediate member or deflection member.

It is expedient in this connection to design the control element as a switching ring or similar component which is disposed on or in the chuck body, is movable in the axial direction or rotatable relative to the chuck body and is directly lockable in the engaged position of the locking members, e.g. by means of locking bolts, detent pins, ball detents or the like or indirectly through associated actuating members.

For the automatic connection of the control element to the locking members, in a sample embodiment of the invention, an intermediate member and/or deflection member may be inserted in each basic jaw by means of which the shifting motions of the control element are translatable into axial feeding motions of the locking members.

The deflection members may be differently designed. According to one advantageous and simple embodiment they may each consist of dual-armed levers which are pivotably mounted in a preferably centrally disposed recess of the basic jaws. One end of each lever is hinged to a movable intermediate member or directly to the axially movable control element while its other end is hinged to the locking members. It is also possible to design the deflection members as bolts which are rotatably mounted in the basic jaws and automatically connected, via teeth, a lever or a cam provided in their outer or inner area, to intermediate members inserted axially movable in the basic jaws and coupled to the control element. The deflection members may alternatively be directly coupled to the control element. The deflecting members communicate in their inner or outer area with the locking members via more teeth, a lever or a cam.

According to another embodiment of the invention, the deflection members are designed as actuating bolts inserted in the basic jaws so as to be radially movable, beveled surfaces being machined preferably on their outer and inner faces, by means of which they are automatically connected to countersurfaces provided on the intermediate members and locking members. It is recommended here to design the beveled surfaces of the intermediate members, actuating bolts and locking members as mutually engaging key hooks.

One particularly simple design of the device results from designing the intermediate members on their side facing the basic jaws as locking members which can be locked in a recess machined in each attachment chucking jaw. Deflection members are unnecessary in this embodiment.

To couple the intermediate members to the control element it is recommended to fasten to it, preferably centrally on the basic jaws, actuating bolts, to which the intermediate members are automatically coupled via a radially adjustable tongue and groove connection e.g. in the manner of a hammer head connection, to compensate for the adjusting motions of the basic jaws.

For the actuation of individual members of the chuck the control element may be designed as a tiltably mounted ring supported by convexly curved surfaces machined on the actuation bolts or on the intermediate members.

According to another embodiment, the deflection members may also be designed as bolts rotatably mounted in the basic jaws and automatically connected to the rotatable control element and to the locking members by suitable levers, teeth or cams.

The device designed according to the invention for the coupling of attachment chucking jaws to basic jaws adjustably guided in the chuck body of a chuck is not only simple in its structural design and easy to handle, depending on the embodiment, it also assures, above all, that the attachment chucking jaws are always locked reliably and functionally safely. And since the locking takes place in form-closing fashion, the various operating states can be monitored without difficulties and without great structural expenses. If an axially movable or rotatable control element is provided for the actuation of the locking members, which control element is connected to the locking members via intermediate and/or deflection members, an automatic mechanical connection is created which is extremeley resistant to breakdowns thus resulting in high reliability of operation even under difficult operating conditions. Springs for the actuation of the locking members are no longer needed, nor are axially oriented forces to be transmitted through the pallets to release the lock. Furthermore, the attachment chucking jaws can be designed so as to be closed so that no dirt can get between them and the guiding means for the locking members when the attachment chucking jaws are attached. Accordingly, operating failures caused by such a condition are also precluded. Since all locking members are actuated by one common control element, monitoring, in particular as to whether the locking members are in their coupled position so that the attachment chucking jaws are locked, can be accomplished without problem by watching the position of the control element.

Some embodiments of the device designed according to the invention for coupling attachment chucking jaws to basic jaws movably guided in the chuck body of a chuck, are illustrated in the drawing and explained in greater detail below.

DESCRIPTION OF THE PREFERRED EMBODIMENTS

Figure 1:
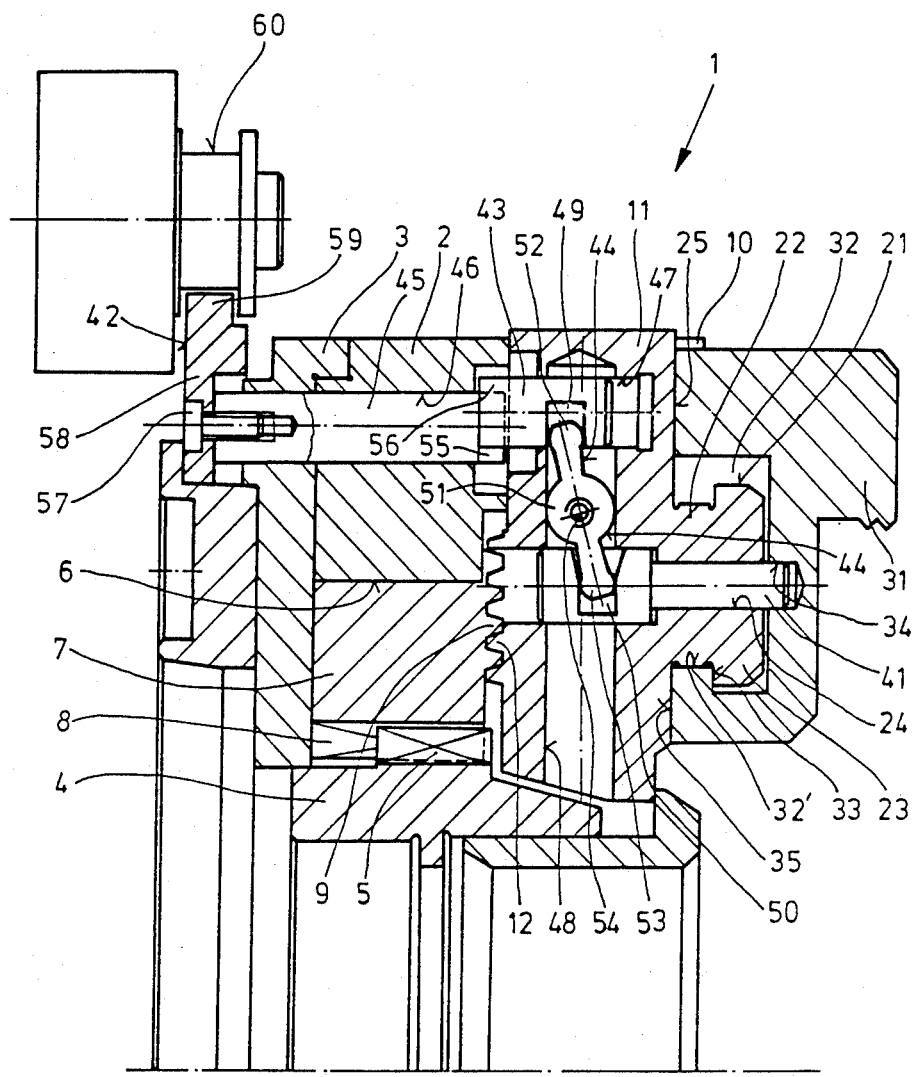
FIG. 1 is a partial axial sectional view of a power chuck with radially movable basic jaws to which attachment chucking jaws are coupled, with mechanical actuation of locking members and a pivotable lever acting as a deflection member.

The power actuated chuck shown in FIG. 1 and designated 1 has several, preferably three, basic jaws 11 which are evenly distributed over the circumference of the chuck body 2. Jaws 11 are movably guided in radially oriented grooves or guides 10 and are drivable by a central control piston 4 via key rods 7, Towards this end, the key rods 7, inserted in tangentially oriented recesses 6 of the chuck body 2, which recesses are closed by a cover 3, are each provided with a keyway 8 engaged by projections 5 formed on the control piston 4 as well as with teeth 9 which mesh with teeth 12 machined on the basic jaws 11. Since the keyways 8 and the projections engaging them are inclined in the axial direction, an axial motion of the control piston 4 is transmitted into a radial motion of the basic jaws 11 in this manner.

An attachment chucking jaw 31 is detachably attached to each basic jaw 11. This purpose is served by an axial extension 21 machined on the basic jaw 11 and engaging and lockable in a recess 32 provided in the attachment chucking jaw 31. Each extension 21 is formed by a bolt 22 of round section at whose free end a radial projection in the form of a collar 23 is formed. Also, in diameter and rotational symmetry the recess 32 is larger than the collar 23 so that the extension 21 can radily be introduced into the recess 32.

To couple the extension 21 provided on the basic jaw 11 to the attachment chucking jaw 31, the recess 32 machined therein has an undercut 33 which the collar 23 of the extension 21 engages and which is formed by a round, turned depression. The collar 23 of the extension 21 is thus supported by the attachment chucking jaw 31 in coupled position so that a large radial bearing surface perpendicular to the chuck axis is created. Locking in the radial direction is provided in that the bolt 22 makes contact with the axial wall 32' of the recess 32 located ahead of the undercut 33. In addition, the attachment chucking jaw 31 is guided laterally and thus retained secure against rotation in the groove 10 of chuck body 2.

All that is needed to couple the attachment chucking jaw 31 to the basic jaw 11 is to move the attachment chucking jaw 31 in the axial direction of the chuck 1 so that the extension 21 formed on the basic jaw 11 is introduced into the recess 32 and that the contact surfaces 35 of the attachment chucking jaws 31 are supported by the contact surface 25 of the basic jaw 11. Then one of the jaws, expediently the basic jaw 11, is to be moved radially until contact with the bolt 22 is made.

Since the supporting surface of the undercut 33 also extends in the radial direction and since the face of the attachment chucking jaw 11 facing the basic jaw 11 is supported by the latter, there is no problem in transmitting even very great forces. In addition, by turning the attachment chucking jaws 31 by 180°,. a change-over from outside chucking to inside chucking is easily made without the need for structural changes or other measures. This is due to the rotational symmetry of extention 21 with its collar 23 and bolt 22, about its own axis.

For functionally safe locking of the attachment chucking jaws 31 with the basic jaws 11 in their coupled position, there is inserted in a hole 24 provided centrally in the extension 21, a locking member 41. Each locking member can be introduced into a recess 34 (formed as a blind hole) which is machined into the attachment chucking jaw 31. When locking members actuated in differnt manner by means of control elements engage the recesses 34 of the attachment chucking jaws 31, the attachment jaws are immovably connected to the basic jaws 11.

In the embodiment according to FIG. 1 there is provided for the axial movement of the locking members 41 a likewise axially movable control element 42 which is disposed on the cover 3 of the power chuck 1. Control element 42 for each jaw 11 acts upon the locking members 41 via intermediate members 44 are here designed as levers 51 which are each pivotably mounted on a pin 54 in a radially oriented hole 48 of the basic jaws 11. One end 52 of lever 51 engages a recess 49 of the intermediate member 43 while its other end 53 engages a recess 50 of the locking element 41. Consequently, the axial motion of the control element 42 disposed in the outer area of the power chuck 1 is transmitted to the locking members 41 located radially inwardly of the control element.

To connect the intermediate members 43 automatically to the control element 42 there are provided in holes 46 of the chuck body 2 movably mounted actuating bolts 45 fastened to the control elements 42 by screws 57.

By means of a hammer head 55 machined on the other end of the actuating bolts 45 and engaging a corresponding radial slot 56 of the intermediate members movably guided in a hole 47 of the basic jaws 11, a connection is created, by means of which the radial motion of the basic jaws 11 can be equalized. Head 55 can thus push intermediate member 43 in any radial position of basic jaw 11.

In the embodiment according to FIG. 1, the control element 42 is designed as a switching ring with formed-on extension 59 engaged by a servo device 60, such as a double action cylinder and piston combination having parts disposed diametrically opposite each other to move ring 42 to the right and to the left. When the piston of the servo device 60 moves to the right, the control element 42 is taken along, and its control motion is transmitted to the locking members 41 via the actuating bolts 45, the intermediate members 43 and the deflection members 44 so as to move them to the left, thus pulling locking members 41 out of the holes 34 for each jaw 31. The locked attachment chucking jaws 31 are thus released so that they can be removed from the basic jaws 11, e.g. by moving the latter radially. The locking members 41 can also be secured in simple manner in their coupled position (in hole 34) by means of the servo device 60 which can move the ring 42 to the left.

Figure 2:
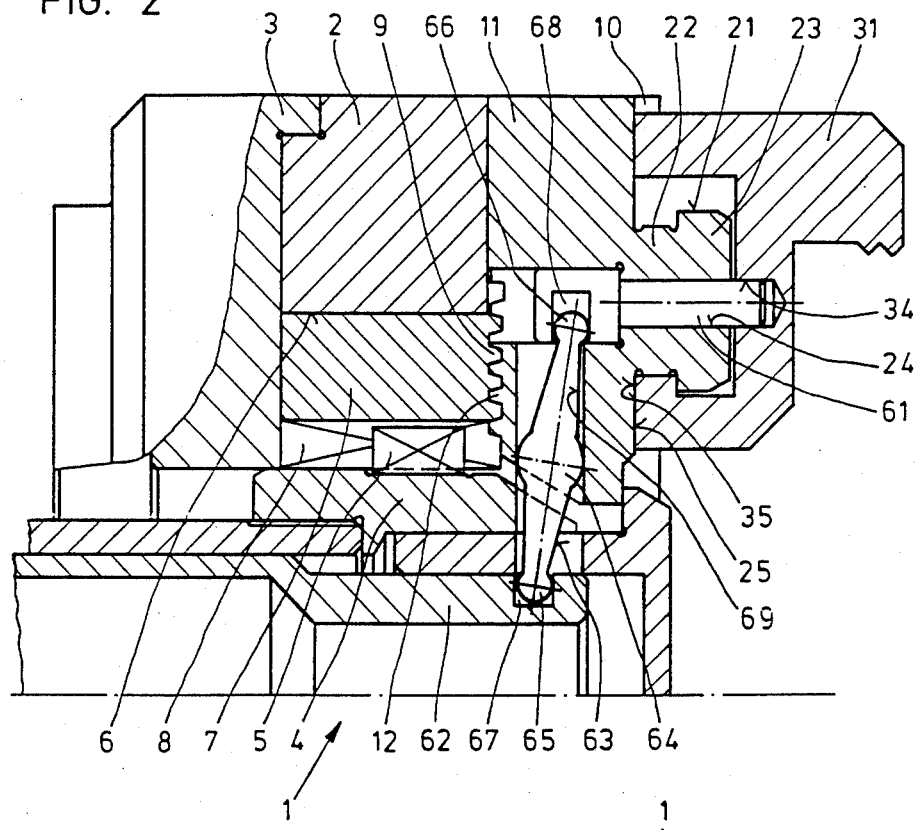
FIG. 2 is a view similar to FIG. 1 but showing a different arrangement of the deflection member in the power chuck.

In the embodiment according to FIG. 2, the transmission of control motions of a control element 62 disposed within the power chuck 1, to the locking members, is effected through a deflection lever 63 which is directly coupled to the control element 62 and is likewise designed as a lever 64. The single control element 62, which/is in the form of a control piston or switching ring can move all the levers 64 for all the jaws 11.

In this way intermediate members are not required in this embodiment. All reference numerals in FIG. 2, as well as those common to FIG. 3 through 10 designate the same or similar parts as in FIG. 1.

Figure 3:
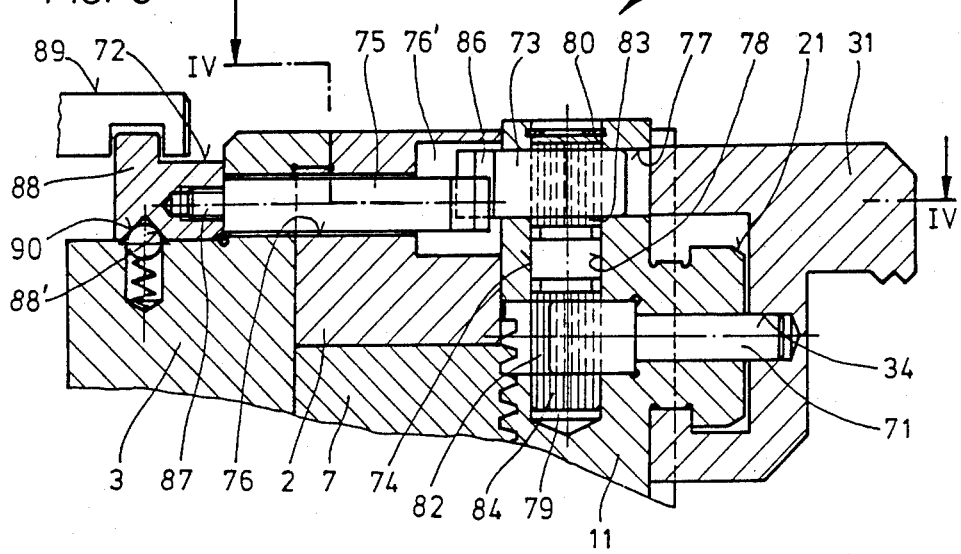
FIG. 3 is a partial axial sectional view of the power chuck according to FIG. 1 but with a rotatable bolt acting as a deflection member.
Figure 4:
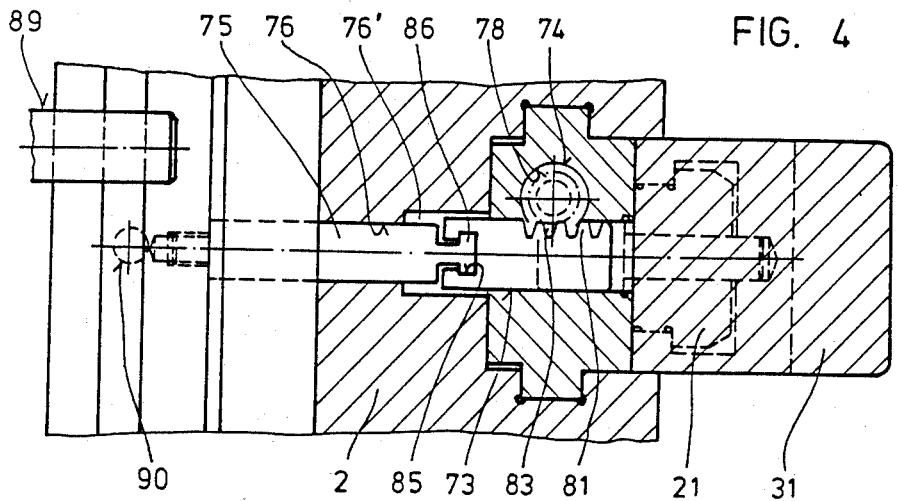
FIG. 4 is a sectional view taken along line IV—IV of FIG. 3.
Figure 5:
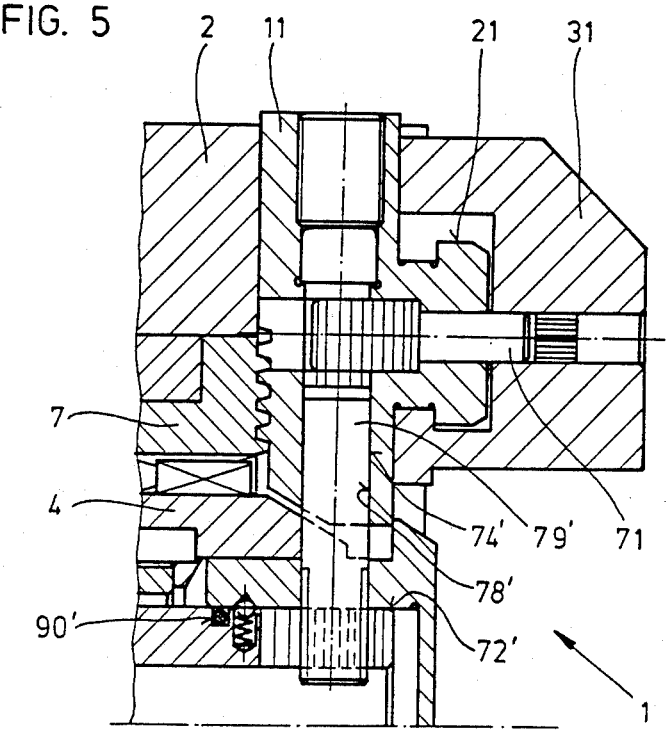
FIG. 5 is a partial axial setional view of a different embodiment of the power chuck.

In the embodiments according to FIGS. 3, 4 and 5, the transmission of control motions of the control element 72 or 72' to the locking members 71 is served by bolts 79 or 79' acting as deflection members 74 or 74' rotatably mounted in radial holes 78 or 78'. According to FIGS. 3 and 4, axially movable intermediate members 73 are provided in holes 77 or the basic jaws 11. According to FIG. 5, the bolts 79' are actuated directly by the control element 72'.

The bolts 79, secured in the holes 78 by snap rings 80 and also the bolts 78' are equipped with teeth 83 and 84 which interact with mating teeth 81,82 machined on the intermedite members 73 and locking members 71. Triggered by a control cylinder 89 in FIG. 3, the control motion of the control element 72 designed as a switching ring 88 is thus transmitted through the actuating 75 guided in the holes 76 of the chuck body 2 and rigidly connected to the control element 72 by means of an extension 87 to the intermediate members 73 guided in axial holes 77 of the basic jaws 11 and from the latter to the locking members 71 by means of the rotatable deflection members 74. In engaged position, the locking members 71 are secured by means of a spring detent 90 which snaps into a recess 88' machined into the switching ring 88 and forming detent means. In order to maintain the automatic connection between the actuating bolts 75 and the intermediate members 73 also when the basic jaws 11 are moved radially, T-shaped slots 85 are machined into the intermediate members 73, and the actuating bolts 75 are provided with a T-shaped hammer head 86 so that a radial motion of the intermediate members 73 in the cutout 76' is possible. FIG. 4 shows the T-shape of slot 85 and head 86. Head 55 in FIG. 1, and its slot 56 may have a similar shape.

The teeth provided on the control element 72' designed as a movable sleeve and interacting with the bolt 79', are machined into the side walls of lengthwise slots in the element 72' (FIG. 5). Furthermore, the control element 72' can be arrested by means of a spring detent 90'.

Figure 6:
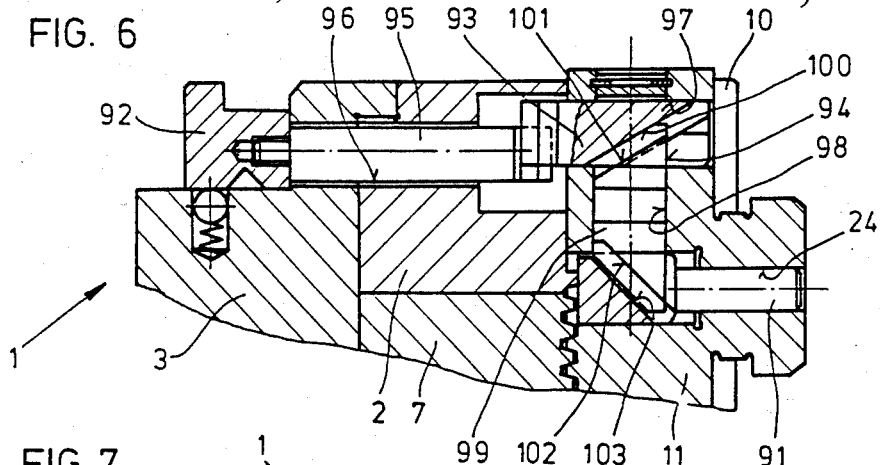
FIG. 6 is a partial sectional view of the power chuck according to FIG. 1 but with a radially movable adjusting bolt acting as a deflection member.

In the embodiment according to FIG. 6 a control bolt 99 is provided as the deflection member 94. Each bolt 99 is inserted in a radially oriented hole 98 of the basic jaws 11. The faces of bolt 99 are machined with beveled surfaces 101 and 102 in the form of key hooks which interact with countersurfaces 103 and 100, respectively, provided on the locking members 91 and on an intermediate member 93 for the transmission of the axial control motion of the control element 92 to the locking members 91. When the control element 92 is moved to the left, this motion is transmitted to the intermediate members 93 disposed in holes 97 of the basic jaws 11 via actuating bolts 95 inserted in holes 96 of the chuck body 2 and deflected by means of the deflection members 94 automatically coupled to the intermediate members 93 so that the locking members 91, guided in the holes 24, are moved to the right so they can engage the recesses 34 provided in the attachment chucking jaws 31.

Figure 7:
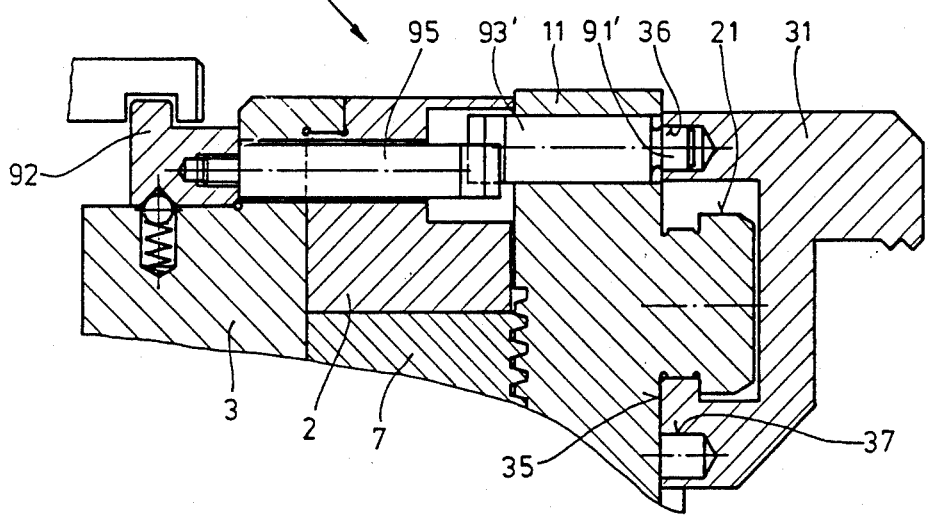
FIG. 7 is a partial sectional view of the power chuck according to FIG. 1 but with its intermediate member designed as a locking member.

According to FIG. 7, the locking members 91' are formed directly on the intermediate members 93'. The deflection members, such as those provided in the embodiment according to FIG. 6, are thus eliminated. The locking members 91', machined as offset bolts at the free ends of the intermediate members 93', here engage the recesses 36 or 37 which are machined into the contact urface 35 of the attachment chucking jaw 31.

In the embodiments according to FIGS. 1 through 7, the locking members are actuated jointly by means of control element.

Figure 8:
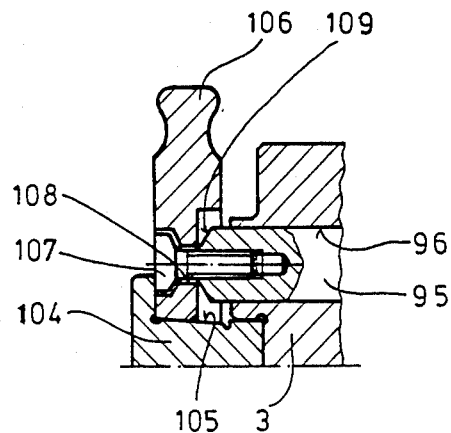
FIG. 8 is a sectional detail view of a tiltably mounted switching ring acting as a control element for the individual actuation of intermediate members in the power chuck according to FIG. 7.

But in order to be able to actuate them individually also, so that the attachment chucking jaws of a chuck can be exchanged manually one after the other, for instance, a flange 104 may be provided on the cover 3 or chuck body 2 of the chuck 1, as shown in FIG. 8, on which a switching ring 106 is tiltably mounted. Towards this end, the flange 104 has a convexly curved surface 105. The faces 109 of the actuating bolts 95 are also curved and the bolts 95 are fastened to the switching ring 106 by means of screws 107 penetrating a hole 108 with clearance.

When the switching ring 106 is tilted, only one of the actuating bolts 95, mutually offset by 120°, (if there are three equally spaced jaws on the chucks)is taken along so that only one lock is released also and the attachment chucking jaws can be exchanged one after the other.

Figure 9:
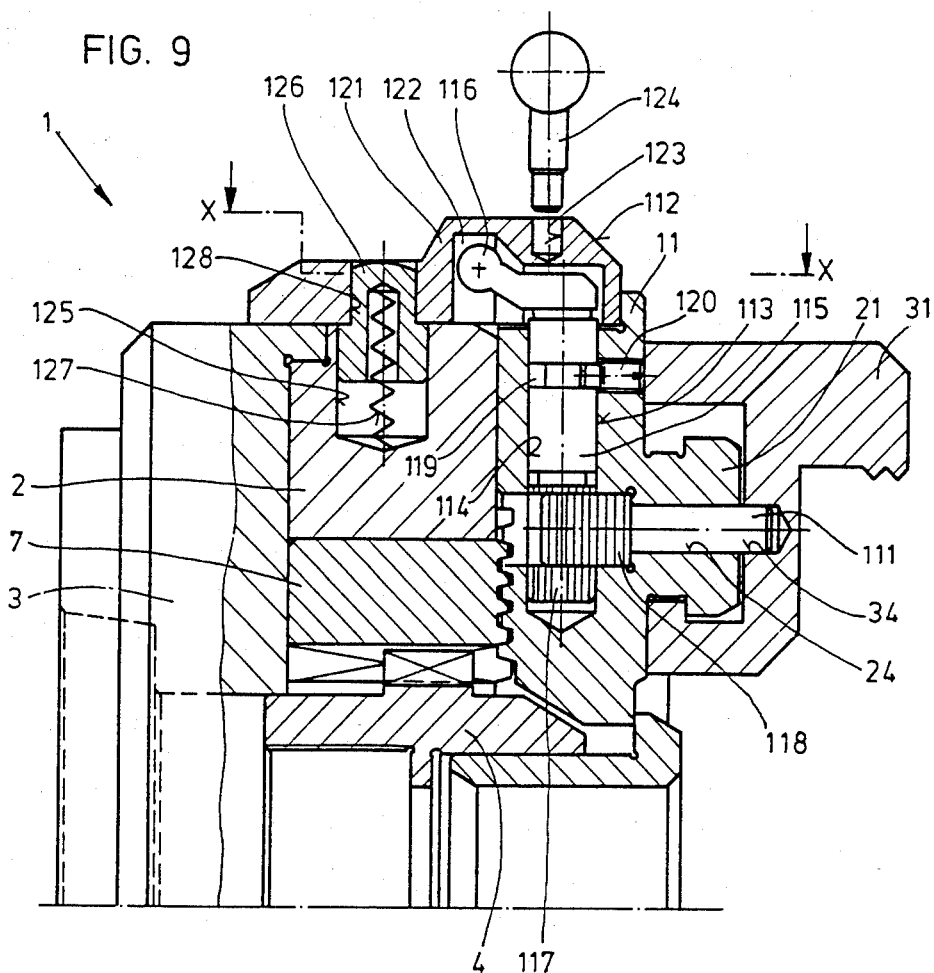
FIG. 9 is a view similar to FIG. 1 but with a rotatably mounted control element.
Figure 10:
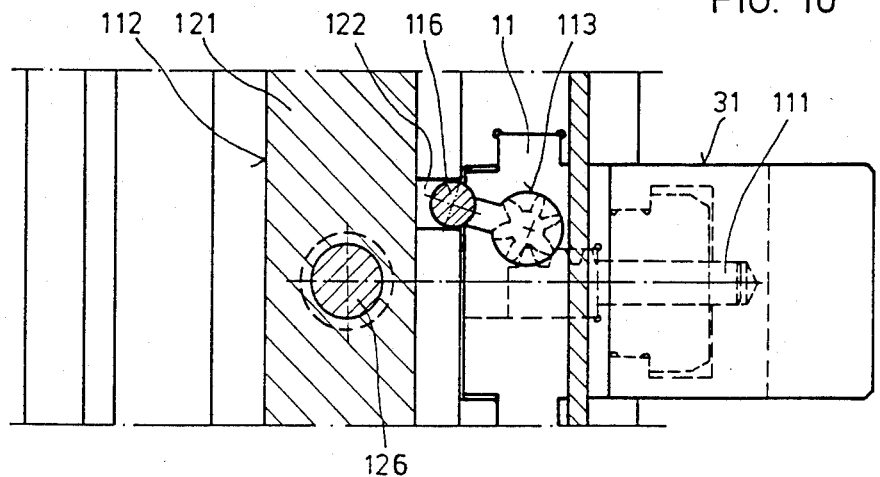
FIG. 10 is a view taken on line X—X of FIG. 9 showing the power chuck according to FIG. 9.

According to FIGS. 9 and 10, there is provided as control element 112 in the form of a ring which is rotatably mounted on the chuck body 2 of the power chuck 1 and automatically coupled to the locking members 111 via likewise rotatable deflection members 113.

For this purpose there are inserted in radially oriented holes 114 of the basic jaws 11, bolts 115 which are secured against radial shifting by pins 120 engaging slots 119 and which are in driving connection with the control element 112 by means of a projecting lever 116 engaging a recess 122 in the control element 112 and, via mating teeth 117 and 118, with the locking members 111. When the control element 112, designed as switching ring 121, is turned, which can be done manually, e.g. by means of a wrench 124 introduced into a recess 123 or by a servo device, the motion of the control element 112 is transmitted to the bolts 115 and from them to the locking members 111 so that the latter are pulled back out of the holes 34, thus releasing the lock of the attachment chucking jaws 31.

When the attachment chucking jaws 31 are locked in, the engagement of the locking members 111 in the holes 34 is secured. This is accomplished by a detent pin 126 inserted into a cutout 125 of the chuck body 2 and pushed into a recess 128 machined into the switching ring 121 by the force of a spring 127. Accordingly, without an additional operation to depress the detent pin 126 it is not possible to turn the control element 112 and release the lock between the attachment chucking jaws 31 and the basic jaws 11 by means of the locking members 111.

In each embodiment the locking member is connected to the control element by interconnection means such as the intermediate and/or deflecting members, which allows for the radial motion of basic jaws 11 while transmitting to motion of the control element into axial motion of the locking member.

While specific embodiments of the invention have been shown and described in detail to illustrate the application of the principles of the invention, it will be understood that the invention may be embodied otherwise without departing from such principles.

What is claimed is:

1. A chuck with a device for coupling jaws to basic jaws thereof, comprising:

a chuck body having a plurality of radially extending guides and an axial direction and a central axis extending in said axial direction;

a basic jaw mounted for radial motion in each guide, each basic jaw having an axial extension with a radial projection and a stop surface thereon, said basic jaw having a radial contact surface around said extension and an axial hole therein;

an attachment chucking jaw for each basic jaw, said chucking jaw having a recess therein with an axial opening large enough to receive said extension of said basic jaw with its projection, said recess having a radial undercut for accepting said radial projection of said extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;

a locking member mounted for axial movement in said axial hole of said basic jaw, said locking member having an end which is engageable in said axial blind hole of said chucking jaw when said chucking jaw is locked to said basic jaw for radially locking said chucking jaw to said basic jaw in an opposite radial direction;

a control element mounted for engagement with said chuck body, said control element comprising a switching ring mounted for movement to said chuck body and concentric with said axis thereof;

interconnection means operatively interconnecting said locking member with said control element for transmitting movement of said control element into axial movement of said locking member into and out of said axial blind hole of said chucking jaw, while permitting radial movement of said basic jaw on said chuck body; and detent means operatively connected between said control element and said chuck body for holding said control element in a position wherein said locking member is engaged in said axial blind hole of said chucking jaw.

2. A chuck according to claim 1, wherein said switching ring is mounted for axial movement to said chuck body, said detent means comprising a detent recess on one of said control element and chuck body and a spring loaded detent member mounted for radial movement on the other of said control element and chuck body, said detent member being engageable in said detent recess for holding said control element in its position with said locking member in said axial blind hole of said chucking jaw.

3. A chuck according to claim 1, wherein said switching ring is mounted for rotation about said chuck body axis, said detent means comprising a detent recess in one of said control element and chuck body, and a spring loaded detent member mounted for radial movement in the other of said control element and chuck body, said detent member being engageable in said detent recess for holding said control element in its position with said locking member in said axial blind hole of said chucking jaw.

4. A chuck according to claim 3, wherein said interconnection means comprises a bolt rotatably mounted about a substantially radial axis to said basic jaw, said bolt having spaced apart ends, one end of said bolt being operatively connected to said locking member for moving said locking member axially with rotation of said bolt, the opposite end of said bolt being operatively connected to said rotatable switching ring for rotation of said bolt with rotation of said switching ring.

5. A chuck with a device for coupling chucking jaws to basic jaws thereof, comprising:
a chuck body having a plurality of radially extending guides and an axial direction and a central axis extending in said direction;
a basic jaw mounted for radial motion in each guide, each basic jaw having an axial extension with a radial projection and a stop surface thereon, said basic jaw having a radial contact surface around said extension and an axial hole therein;
an attachment chucking jaw for each basic jaw, said chucking jaw having a recess therein with an axial opening large enough to receive said extension of said basic jaw with its projection, said recess having a radial undercut for accepting said radial projection of siad extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;
a locking member mounted for axial movement in said axial hole of said basic jaw, said locking member having an end which is engageable in said axial blind hole of said chucking jaw when said chucking jaw is locked to said basic jaw for radially locking said chucking jaw to said basic jaw in an opposite radial direction;
a control element mounted for axial engagement with said chuck body and being concentric around said axis of said chuck body; and
interconnection means operatively interconnecting said locking member with said control element for transmitting movement of said control element into axial movement of said locking member into and out of said axial blind hole of said chucking jaw, while permitting radial movement of said basic jaw on said chuck body, said interconnection means comprising an intermediate member mounted for axial movement to said basic jaw and being operatively connected to said control element for axial movement of said intermediate member with axial movement of said control element independently of radial movement for said basic jaw, said intermediate member being operatively connected to said locking member of axial movement of said locking member with axial movement of said intermediate member.

6. A chuck according to claim 5 including a deflection member movably mounted in said basic jaw and axially extending in said basic jaw, said deflection member having one end operatively connected to said intermediate member and an opposite end operatively connected to said locking member, said ends of said deflection member being spaced radially from each other, and said deflection member being movable to transmit axial movement of said intermediate member into axial movement of said locking member.

7. A chuck according to claim 6, wherein said deflection member comprises a dual arm lever pivotally mounted to said basic jaw, said intermediate and locking members both having recesses therein which face each other, each recess receiving one arm of said dual arm lever for transmitting axial movement from said intermediate member to said locking member with pivotal motion of said lever.

8. A chuck according to claim 6, wherein said deflection member comprises a bolt rotatably mounted about a substantially radial shaft to said basic jaw, said bolt having opposite ends with engagement means engaging said intermediate and locking members respectively for transmitting axial movement of said intermediate member to axial movement of said locking member with rotation of said bolt.

9. A chuck according to claim 6, wherein said deflection member comprises a bolt mounted for radial movement to said basic jaw and having opposite ends with incline surfaces engaging inclined surfaces of said intermediate and locking members respectively for transmitting axial movement of said intermediate member into axial movement of said locking member with radial movement of said bolt.

10. A chuck according to claim 9, wherein said bolt has key hook means at opposite ends thereof which carries said inclined surfaces of said bolt, said intermediate and locking members each having key hook means thereon defining said inclined surfaces of said intermediate and locking members respectively.

11. A chuck with a device for coupling chucking jaws to basic jaws thereof, comprising:
a chuck body having a plurality of radially extending guides and an axial direction;
a basic jaw mounted for radial motion in each guide. each basic jaw having an axial extension with a radial projection and a stop surface thereon, said basic jaw having a radial contact surface around said extension and axial hole therein;
an attachment chucking jaw for each basic jaw, said chucking jaw having a recess therein with an axial opening large enough to receive said extension of said basic jaw with its projection, said recess having a radial undercut for accepting said radial projection of said extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;
a locking member mounted for axial movement in said axial hole of said basic jaw, said locking member having an end which is engageable in said axial blind hole of said chucking jaw when said chucking jaw is locked to said basic jaw for radially locking said chucking jaw to said basic jaw in an opposite radial direction;
a control element mounted for engagement with said chuck body; and
interconnection means operatively interconnecting said locking member with said control element for transmitting movement of said control element into axial movement of said locking member into and out of said axial blind hole of said chucking jaw, while permitting radial movement of said basic jaw on said chuck body, said interconnection means including a dual arm lever pivotally mounted to said basic jaw having radially spaced apart opposite ends, said locking member having a radially extending recess for receiving one end of said lever and said opposite end of said lever being operatively connected to said control element for transmitting axial movement of said control element to said locking member, said control element being mounted for axial movement to said chuck body.

12. A chuck with a device for coupling chucking jaws to basic jaws thereof, comprising:

a chuck body having a plurality of radially extending guides and an axial direction;

a basic jaw mounted for radial motion in each guide, each basic jaw having an axial extension with a radial projection and a stop surface thereon, said basic jaw having a radial contact surface around said extension and an axial hole therein;

an attachment chucking jaw for each basic jaw, said chucking jaw having a recess therein with an axial opening large enough to receive said extension of said basic jaw with its projection, said recess having a radial undercut for accepting said radial projection of said extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;

a locking member mounted for axial movement in said axial hole of said basic jaw, said locking member having an end which is engageable in said axial blind hole of said chucking jaw when said chucking jaw is locked to said basic jaw for radially locking said chucking jaw to said basic jaw in an opposite radial direction;

a control element mounted for engagement with said chuck body; and interconnection means operatively interconnecting said locking member with said control element for transmitting movement of said control element into axial movement of said locking member into and out of said axial blind hole of said chucking jaw, while permitting radial movement of said basic jaw on said chuck body, said interconnection means comprising a bolt rotatably mounted about a substantially radial axis to said basic member and having opposite toothed ends, said locking member having teeth engaged with one toothed end of said bolt and said opposite toothed end of said bolt being operatively connected to said control element for transmitting axial movement of said central element in axial movement of said locking member with rotation of said bolt.

13. A chuck with a device for coupling chucking jaws to basic jaws thereof, comprising:

a chuck body having a plurality of radially extending guides and an axial direction and a central axis extending in said axial direction;

a basic jaw mounted for radial motion in each guide, each basic jaw having an axial extension with a radial projection and a stop surface thereon, said basic jaw having a radial contact surface around said extension and an axial hole therein;

an attachment chucking jaw for each basic jaw, said chucking jaw having a recess therein with an axial opening large enouth to receive said extension of said basic jaw with its projection, said recess having a radial undercut for accepting said radial projection of said extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;

a locking member mounted for axial movement in said axial hole of said basic jaw, said locking member having an end which is engageable in said axial blind hole of said chucking jaw when said chucking jaw is locked to said basic jaw for radially locking said chucking jaw to said basic jaw in an opposite radial direction;

a control element mounted for movement to said chuck body said control element including a single ring-shaped member and a separate bolt for each basic jaw, each bolt being fixed to said ring-shaped member and being axially moveable in said chuck body, said bolt having an end opposite from said ring-shaped member and head plus slot means operatively connected between said opposite end of said bolt and said locking member for transmitting axial movement of said bolt into axial movement of said locking member; and interconnection means operatively interconnecting said locking member with said control element for transmitting movement of said control element into axial movement of said locking member into and out of said axial blind hole of said chucking jaw, while permitting radial movement of said basic jaw on said chuck body.

14. A chuck according to claim 13, wherein said ring-shaped member is mounted to said chuck body tilting with respect to said central axis, each bolt being connected to said ring-shaped member for permitting relative tilting between said bolt and said ring-shaped member.

15. A chuck with a device for coupling chucking haws to basic jaws thereof, comprising:

a chuck body having a plurality of radially extending guides and an axial direction;

a basic jaw mounted for radial motion in each guide, each basic jaw having an axial extension with a radial projection and a stop surface thereon, said basic jaw having a radial contact surface around said extension and an axial hole therein;

an attachment chucking jaw for each basic jaw, said chucking jaw having a recess therein with an axial opening large enough to receive said extension of said basic jaw with its projection, said recess having a radial undercut for accepting said radial projection of said extension for axially locking said chucking jaw to said basic jaw, said recess having an axial wall against which said stop surface of said basic jaw is engaged for radially locking said chucking jaw to said basic jaw in one radial direction, said chucking jaw having an axial blind hole aligned with said axial hole of said basic jaw when said chucking jaw is locked to said basic jaw;

a locking member mounted for axial movement in said axial hole of each basic jaw, each locking member having an end which is engageable in said axial blind hole of one chucking jaw when said chucking jaw is locked to said basic jaw for radially locking said chucking jaw to said basic jaw in an opposite radial direction;

a single control element mounted for engagement with said chuck body; and interconnection means operatively interconnecting each locking member with said single control element for transmitting movement of said control element into axial movement of each locking member into and out of said axial blind hole of said chucking jaw, while permitting radial movement of said basic jaw on said chuck body, said interconnection means including a radially extending locking slot in said locking member and a radially extending locking head in said control element, locking head being engaged in said locking slot for transmitting axial movement of said control element direction into axial movement of said locking member while permitting radial movement of said basic jaw.

* * * * *